Nov. 8, 1949   F. RIMMINGTON   2,487,375
REMOTE-CONTROL SYSTEM, PARTICULARLY FOR ARC WELDING
Filed June 20, 1945   6 Sheets-Sheet 1
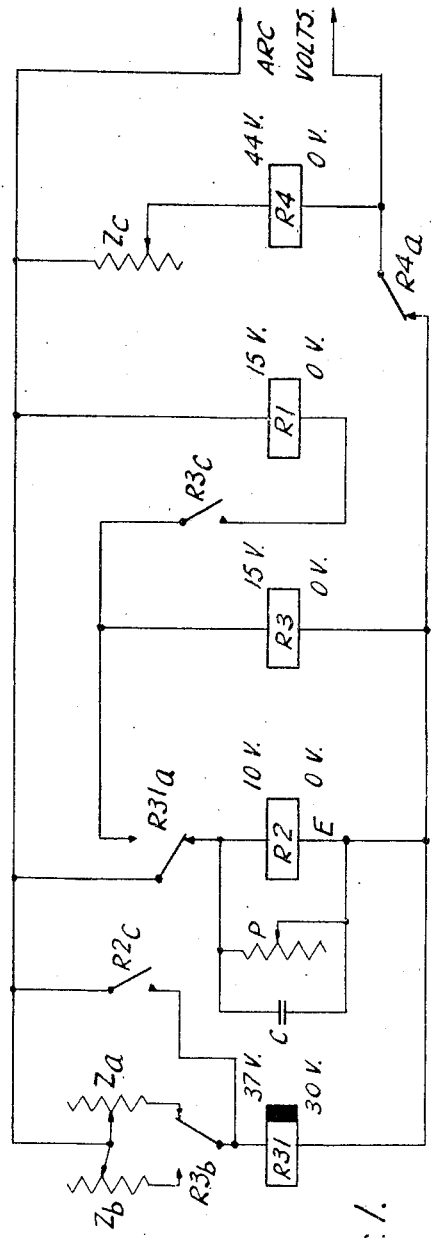
FIG. 1.
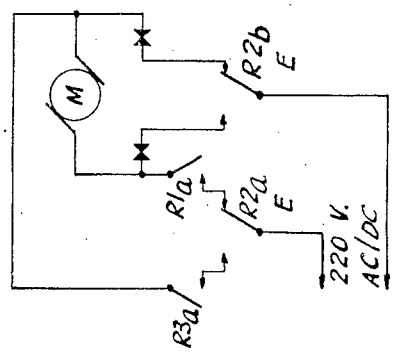
Inventor
Frank Rimmington
By Emery, Holcombe & Blair
Attorneys

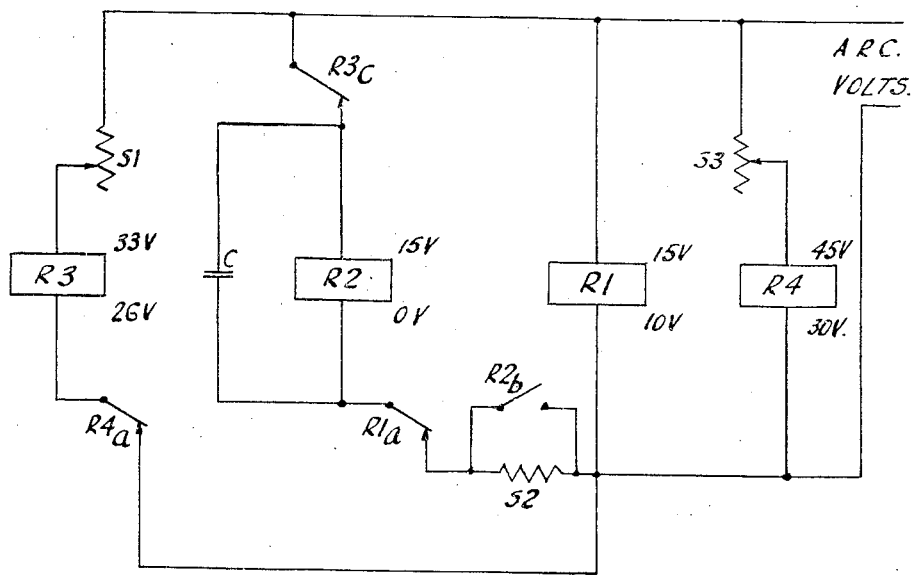
Fig. 2.
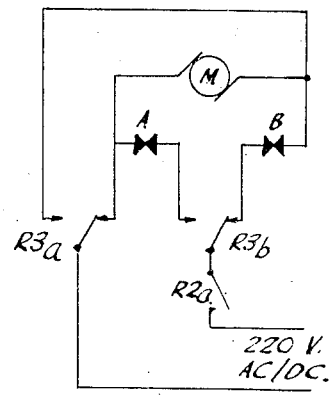

Nov. 8, 1949     F. RIMMINGTON     2,487,375
REMOTE-CONTROL SYSTEM, PARTICULARLY FOR ARC WELDING
Filed June 20, 1945     6 Sheets-Sheet 3

INVENTOR
FRANK RIMMINGTON
BY
ATTORNEYS

INVENTOR
FRANK RIMMINGTON
BY Emery, Holcomb & Blair
ATTORNEYS

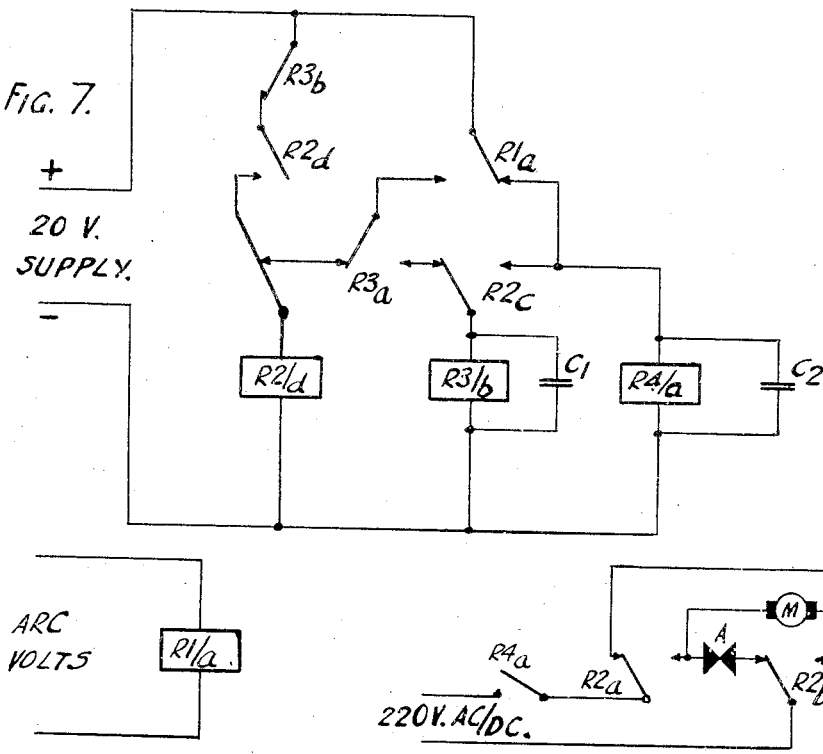
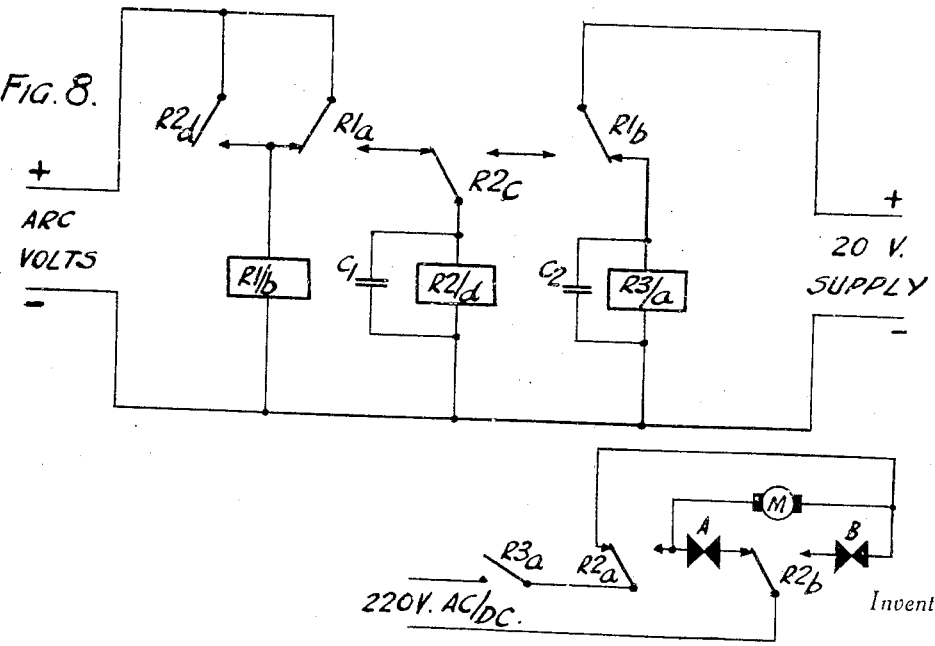

Nov. 8, 1949     F. RIMMINGTON     2,487,375
REMOTE-CONTROL SYSTEM, PARTICULARLY FOR ARC WELDING
Filed June 20, 1945     6 Sheets-Sheet 6
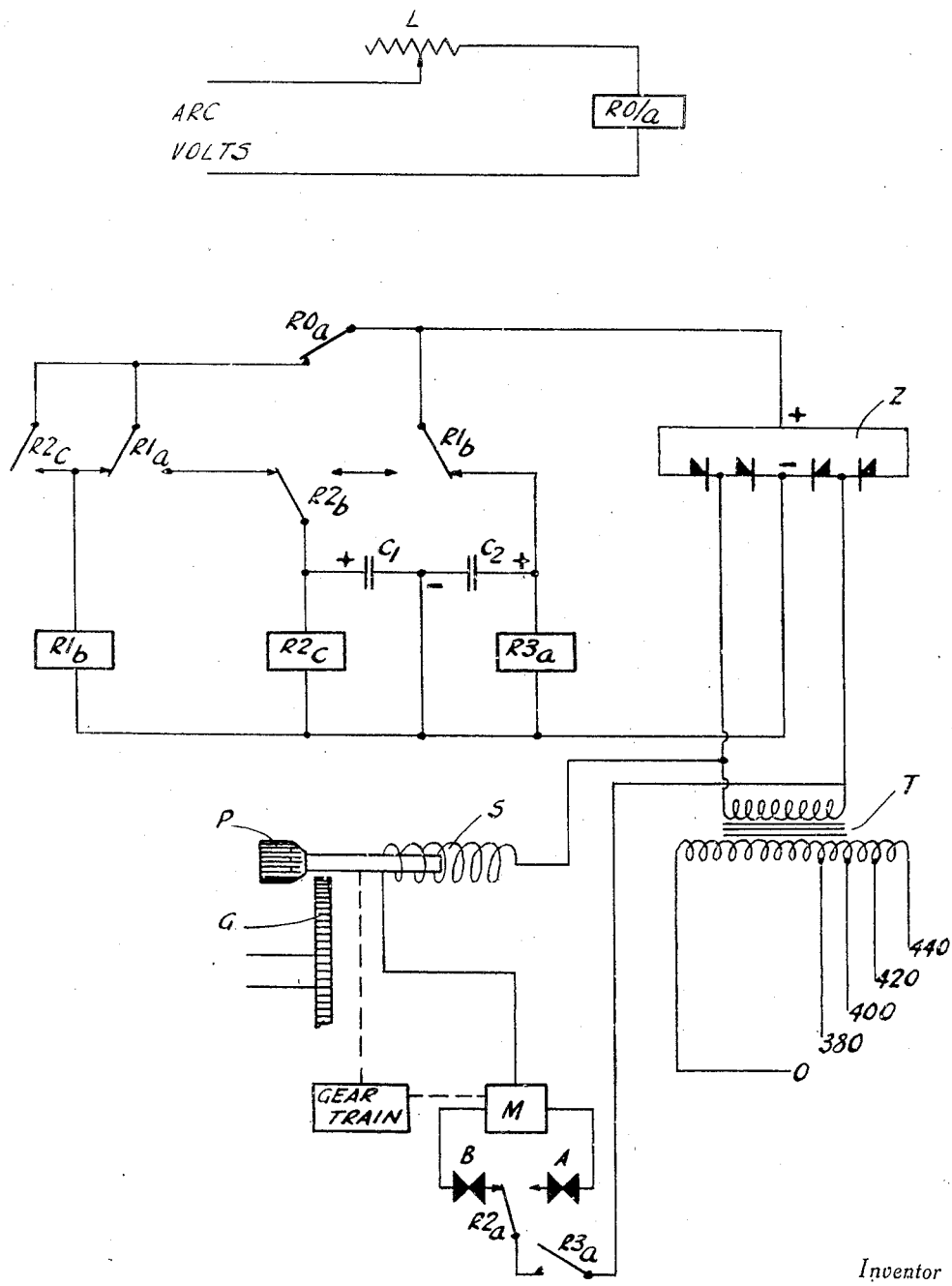
Inventor
Frank Rimmington
by Emery, Holcombe & Blair
Attorneys Patented Nov. 8, 1949

2,487,375

UNITED STATES PATENT OFFICE 2,487,375

REMOTE-CONTROL SYSTEM, PARTICULARLY FOR ARC WELDING

Frank Rimmington, Potters Bar, England

Application June 20, 1945, Serial No. 600,511
In Great Britain June 12, 1944

2 Claims. (Cl. 315—302)

The present invention relates to the remote control of electric generators or other current supply means, whereby the output of the generator or other current supply means may be varied or adjusted from a remote point. The invention is particularly applicable to the remote control of generators or transformers for arc welding.

In the specification of my copending application Serial No. 506,746, now Patent No. 2,443,776, a remote control system is described in which the controlling circuit is shunted across the arc, the voltage variation across the arc with different positions of the electrodes being used to control the operation of voltage selective relays whereby on shortening the arc, for example by scribbling the electrode on the work, the output current controller may be adjusted in one direction whilst, by lengthening the arc, the controller may be adjusted in the opposite direction.

In practice, it has been found that with some generators and transformers it is not easy to reduce the voltage across the arc to a sufficiently constant value to ensure operation of the corresponding voltage selective relay by scribbling the electrode, if this is longer than about four inches. Although this difficulty has been overcome by instructing the operator to change his long electrode for a stub or scrap whenever he wished to reduce the current, this involves a waste of time.

An object of the present invention is to provide modifications of the arrangement described in my aforementioned specification which enables the above disadvantages to be overcome.

In one form, the invention consists in a remote control arrangement in which the drawing out or shortening of the arc prepares a circuit for the motor of the output current controller, the circuit being completed to drive the motor in either one direction or the other depending upon the time interval during which the arc is drawn out or shortened before being returned to its normal welding position. Thus, for example, if the arc is drawn out and immediately, say within five seconds, returned to the normal welding position, the output current controller will be driven in one direction, whilst if the arc is drawn out for a longer time, say for longer than five seconds, then the output current controller will be driven in the opposite direction. When the motor has been started by drawing and holding the long arc, the arc may be restored to its normal welding dimensions, so that for both directions of operation of the output current controller the electrode may be held in its normal welding position with the normal welding arc whilst the adjustment is taking place whereby the operator can see by the colour and behavior of the arc when the current has reached the desired value. The operating action in either case may be arrested by simply breaking the arc and re-striking it.

Fig. 1 of the accompanying drawings shows a remote control arrangement in which the current may be reduced by drawing a long arc for a moment and then immediately returning the electrode to the normal welding position, and in which the current may be raised by drawing a long arc and holding it for a longer time before returning it to the normal welding position. Since for both reducing and raising the current a long arc is drawn, the difficulties experienced with the previous arrangement in obtaining the correct voltage for reducing the current by scribbling the electrode on the work are eliminated.

In Fig. 1, those relays whose function is the same or similar to the relays shown in the drawings of my aforementioned copending application Serial No. 506,746 are similarly numbered. Thus, the relays R1 and R3 control the "current down" and "current up" directions of rotation of the motor respectively. Relay R2 controls both directions whereas in the previous arrangements it only controlled the down direction. R4 is the open circuit relay whose function is to neutralise the whole apparatus under this condition. In the present arrangement, however, it is also used to stop the motor when the current has reached the desired values.

Relay R31 is an additional relay which controls the circuits of relays R3 and R1. Relay R31 is provided with a slow releasing coil to prevent its armature from falling off during the brief breaks when the contact R3b operates. Alternatively, the R3b contacts may be of the "make-before-break" type in which case relay R31 need not be slow releasing.

The voltage values shown at the top and bottom right-hand corners of the relay coil denote the voltages at which the relays operate and release respectively.

The relay R2 is shunted by a condenser C and a resistance P so that this relay has a time delay action, the value of which may be adjusted by the condenser and resistance circuit. Za and Zb are two adjustable resistances for controlling the voltage at which the relay R31 reenergises and releases and the adjustable resistance Zc is likewise provided for adjusting the voltage at which the relay R4 energises. All the relays are shunted across the arc circuit as shown and operate as follows.

It will be assumed that the operator is welding and desires to reduce the current output from the generator or other current supply means. To do this he draws a long arc of approximately one inch which increases the arc voltage to 37 volts, whereby relay R31 is operated and actuates its contact R31a to complete the circuit of the relay R3 and break the circuit of the relay R2. Since the condenser C has been charged it holds relay R2. Relay R3 operates and by closing its contact R3c it prepares a circuit to relay R1. Relay R1 cannot operate, however, because it is short-circuited through the contacts R3c and R31a. At its contact R3b, the relay R3 changes over the resistance in series with relay R31 to prepare the releasing circuit for this relay through the left contact of R3b. As previously mentioned, the relay R31 is slow releasing or the contacts R3b are of the "make-before-break" type so that the relay R31 does not fall off during this change over. At its contact R3a the relay R3 prepares a circuit for the clockwise rotation of the motor M, which is an A. C./D. C. series motor, but the motor does not operate owing to the left-hand contacts of R2a and R2b being open.

The operator then immediately returns the arc to welding length whereupon the arc voltage drops to approximately 25 volts and relay R31 releases through the left-hand contact of R3b. The circuit of the relay R2 is re-made by the contact R31a closing its bottom contact and this takes place before the condenser has had time to discharge and release the relay R2. Although the movement of contact 31a opens the circuit of relay R3 through its upper contact, the relay R3 does not fall off but is held through its R3c contact and relay R1. This energizes relay R1 which at its contact R1a closes the motor circuit to drive the motor in the anti-clockwise direction to drive the output current controller in a direction to reduce the current.

When the operator sees by the colour and behaviour of the arc that the arc current has reached the desired value, he arrests the movement of the output current controller by breaking the arc. The arc voltage thus rises to the open circuit value and relay R4 operates to break the common return of all the other relays at its contact R4a. Relays R3 and R1 release and, in turn, release their contacts, R3b returning to the right-hand contact and the motor circuit being broken at R1a to stop the motor.

The operator then re-strikes the arc whereupon the arc voltage falls to approximately zero, thereby releasing relay R4 which completes at its contact R4a the common return to all the other relays. All the relays remain de-energized due to zero volts across the arc. The short-circuit caused by striking the arc also discharges the condenser C to release relay R2 which changes its contacts R2a and R2b to their left-hand positions. At its contact R2c, it closes a short-circuit across the resistances Za and Zb, but relay R31 is not effected due to the zero voltage across the line and the motor is not operated. On drawing the arc to its normal welding length, the voltage across the arc rises approximately 25 volts. The relay R2 energises to about 10 volts and restores its contacts R2a and R2b to their right-hand positions, but the motor does not operate due to the contacts R3a and R1a being open. Contact R2c opens the short-circuit across the resistance Za and Zb. The operator can then continue welding at the re-adjusted values.

To move the output current controller to increase the arc current, the operator draws a long arc and holds it for a longer time so as to allow the condenser C to discharge and allow relay R2 to fall off. The time period may, for example, be five seconds. On drawing the long arc the arc voltage rises to 37 volts and relay R31 operates as previously described to complete the circuit of relay R3 and break the circuit of relay R2 at its contact R31a. As previously, relay R3 operates and prepares a circuit for the relay R1 at its contact R3c, but the relay R1 cannot operate due to the short-circuit through contact R3c and R31a. Contact R3b changes to its left-hand position and prepares the releasing circuit of relay R31. Contact R3a closes and prepares a circuit for the clockwise rotation of the motor M.

After a time delay of say five seconds, the relay R2 releases owing to the discharge of its condenser C. Thereupon its contacts R2a and R2b change to their left-hand positions and so complete the motor circuit through the contact R3a, whereby the motor is driven in the clockwise direction and drives the output current controller to increase the current. At its contact R2c relay R2 short-circuits the resistances Za and Zb.

As soon as the operator sees in the long arc that the current is rising, he knows that the time delay period has passed and that he can return his electrode to its normal welding position. Having done this, he can observe the rising current at the correct arc length. When the arc is returned to its normal length, the relay R31 remains energised although the arc voltage has now dropped below the releasing value of 30 volts with the resistance Zb in series, since this resistance is short-circuited by the contact R2c. When the arc current has reached the desired setting the arc is broken as previously described to arrest the movement of the current controller. In this case the relay R2 remains released with its contacts R2a and R2b in their left-hand positions, and R2c still short-circuits the resistances Za and Zb but relay R31 releases because the common return is broken at R4a. The arc is then re-struck as previously described, the relay R31 remaining released due to zero volts across the arc. Upon drawing the arc to its normal welding length, however, the relay R2 makes as the arc voltage reaches 10 volts, thus breaking the short-circuit across the resistance in series with relay R31 and preventing relay R31 from energising until the operator has occasion to alter the current valve by again drawing a long arc.

Fig. 2 shows a modified and simplified arrangement as in the arrangement described in Fig. 1, "scribbling" for the purpose of adjusting the current is dispensed with in the apparatus according to this modification, the current being adjusted in one direction by drawing out the arc and either holding it drawn out or restoring it to its normal welding position, and in the opposite direction by making a "dead short" by pressing the electrode or the electrode holder onto the work and maintaining the "dead short" during the time of adjustment.

In the preferred form of this arrangement, adjustment of the current in one direction is effected by drawing a long arc and holding it until the desired adjustment has been made; and adjustment in the opposite direction is effected by making a "dead short" and holding it so long as the adjustment is being made. Preferably, the current is reduced when the electrode is pressed against the work to create a "dead short" so that the operator can easily memorise the operation of the apparatus as follows.

Current down—electrode down and hold down.
Current up—electrode up and hold up.

Thus, in the preferred form of the arrangement, to reduce the current the operator makes a "dead short" by pressing the electrode, or the electrode holder, on to the work whereupon, after a slight delay, the control motor starts and continues to turn the output current controller to reduce the current so long as the short circuit is maintained. To stop the motor the arc is struck. To raise the current the operator draws and maintains a long arc. Again, the motor starts after a slight delay, but in the opposite direction, and continues for so long as the long arc is held, the operator observing from the arc when the current has reached the desired value. To stop the motor the electrode is returned to its normal welding position. The apparatus, therefore, provides visual control of the rising current only, but this is no serious drawback since visual control during reduction of the current has been found to be unnecessary.

In Fig. 2 those relays of which function is the same or similar to the relays shown in Fig. 1 are similarly numbered. Thus, the relays R1 and R3 control the "current down" and "current up" directions of rotation of the motor respectively. Relay R2 controls both directions and relay R4 is the open circuit relay.

The voltage values shown at the top and bottom right-hand corners of the relay coils denote the voltages at which the relays operate and release respectively.

The relay R2 is shunted by a condenser C so that this relay has a time delay action. S1 and S2 are two adjustable resistances for controlling the voltages at which the relays R3 and R4 energise, and the resistance S2 is a protective resistance in series with the relay R2 and condenser C. All the relays are shunted across the arc circuit as shown, the drawing showing the condition of the circuit during normal welding.

In the supply circuit of the motor M, which is an A.C./D.C. series motor, are three sets of switch contacts R3a, R3b and R2a. Contacts R3a and R3b are actuated by the relay R3 and are in effect reversing contacts, normally resting in the right-hand position shown but moving over to the left-hand position when relay R3 is energised. Thus, the relay R3 merely prepares the motor circuit for the required direction of rotation before the time delay relay R2 releases to close its contacts R2a to complete the motor circuit.

The circuit of the time delay relay R2 can be broken at two points, namely at R3c when the arc voltage is increased to 33 volts by drawing and holding a long arc when relay R3 energises to open its contacts R3c, and at R1a during a "dead short" when the relay R1 is de-energised and opens its contact R1a.

During welding only relays R1 and R2 are energised. On open circuit relay R4 only breaks the current of relay R3 so that during open circuit the three relays R1, R2 and R4 are energised.

The mode of operation of the circuit is as follows. It will be assumed that the operator is welding and desires to reduce the current output from the generator or other current supply means. To do this he makes a "dead short" by pressing the electrode, or the electrode holder, on to the work which reduces the arc voltage to between approximately 2 and 8 volts depending upon the length of the cable. This de-energises relay R1 which is designed to release at 10 volts, thus opening the circuit of the time delay relay R2 at its contact R1a. The relay R2, however, does not release for a short time due to the condenser C, and a convenient holding time for the relay R2 has been found to be 1½ seconds. After the condenser C has discharged the relay R2 releases and at its contact R2a completes the motor circuit via the contacts R3a, R3b in their right-hand positions (since R3 is still deenergised) to start the motor M running in the direction to reduce the output from the output current controller. The motor M will continue to run in this direction until the controller reaches the minimum position when it opens the limit switch B, unless the "dead short" has previously been broken, which action also stops the motor. In the latter case a temporary open circuit is created and the arc voltage rises to a minimum of 45 volts which energises relay R4 and also breaks the circuit of relay R3 at contact R4a. Thus, the relay R3 still remains deenergised and does not change over its contacts R3a and R3b. Meanwhile relay R1 energises to complete the circuit of R2 through the short circuit contacts R2b across the protective resistance S2.

The re-striking of the arc produces only a fleeting short circuit so that although relay R1 releases and breaks the circuit of relay R2 at R1a, relay R2 is held by the condenser C and the motor is not started. On drawing the arc to its normal length the arc voltage increases to anything between 15 and 30 volts with peaks of 40 volts. These fleeting peaks cause relay R3 to oscillate and break (at 33 volts) and make (at 26 volts) the circuit of relay R2 at contact R3c, but the motor is not affected because again the condenser C holds the relay R2 energised and hence the contacts R2a remain open. When the arc voltage settles down to approximately 20 volts relay R3 ceases to oscillate and remains de-energised.

In order to increase the current output the operator draws a long arc and holds it. The arc voltage then exceeds 33 volts which energises relay R3. This breaks the circuit of the relay R2 at contact R3c and after a time lapse of 1½ seconds during which the condenser C discharges, the relay R2 releases to complete the motor circuit at R2a. In the meantime, however, relay R3 has shifted its contacts R3a and R3b to their left-hand positions so that upon contact R2a closing the motor M is started but in the opposite direction so as to move the output current controller in a direction to raise the current output. The current will continue to rise so long as the long arc is held or until the output current controller reaches its maximum position and opens its limit contacts A. When the operator observes from the arc that the current has reached the desired value he returns the arc to its normal welding length which reduces the arc voltage to below 26 volts thereby releasing the relay R3 which closes its contacts R3c to complete the circuit of the relay R2. Relay R2 opens its contacts R2a to stop the motor, and contacts R3a and R3b return to their normal right-hand positions. The operator then proceeds with his work with the current held at the new value.

A further modification of the invention consists in controlling the adjustment of the current in one direction or the other depending upon the number of times the arc condition is changed in the same manner, for example, upon the number of times the arc is drawn out or shortened or short circuited. In one embodiment, to reduce the current the arc may be short circuited once and to raise the current it is short circuited twice. According to a feature of the invention, to adjust the current in one direction the normal arc is altered to another condition for a predetermined minimum time and to alter the current in the opposite direction the normal arc is altered to another condition for a predetermined minimum or maximum time, is restored to its normal or another condition, and then returned to the first changed condition for another predetermined time. Whilst the output current controller is moving in one direction or the other, the arc may either be maintained in its changed condition as long as the arc current is being changed or it may be restored to the normal welding position so that a visual indication is obtained of the changing arc current.

In the preferred form of this modification, the current is adjusted in the downwards direction by producing a "dead short" by pressing the electrode or the electrode holder on to the work and maintaining the "dead short" for a predetermined minimum time, say of two seconds duration. To raise the current a fleeting "dead short" is produced followed by a longer "dead short" of the predetermined time duration of say two seconds. In one embodiment, the output current control motor will start in the appropriate direction at the end of either of the two second periods, and will continue to alter the current value so long as the "dead short" is maintained beyond the two second period, the motor being stopped by removing the "dead short" when the operator considers that the arc current has reached the required new value. The operator then restrikes the arc and proceeds with the welding at the new current value. In an alternative embodiment the arc has to be restruck after the "dead short" operations in order to start the motor, whereby the falling or rising current will be visible in the arc. In this case the motor may be stopped by open-circuiting the arc for a predetermined time interval, after which the arc may be restruck and the welding proceed at the new current value.

Figure 3:
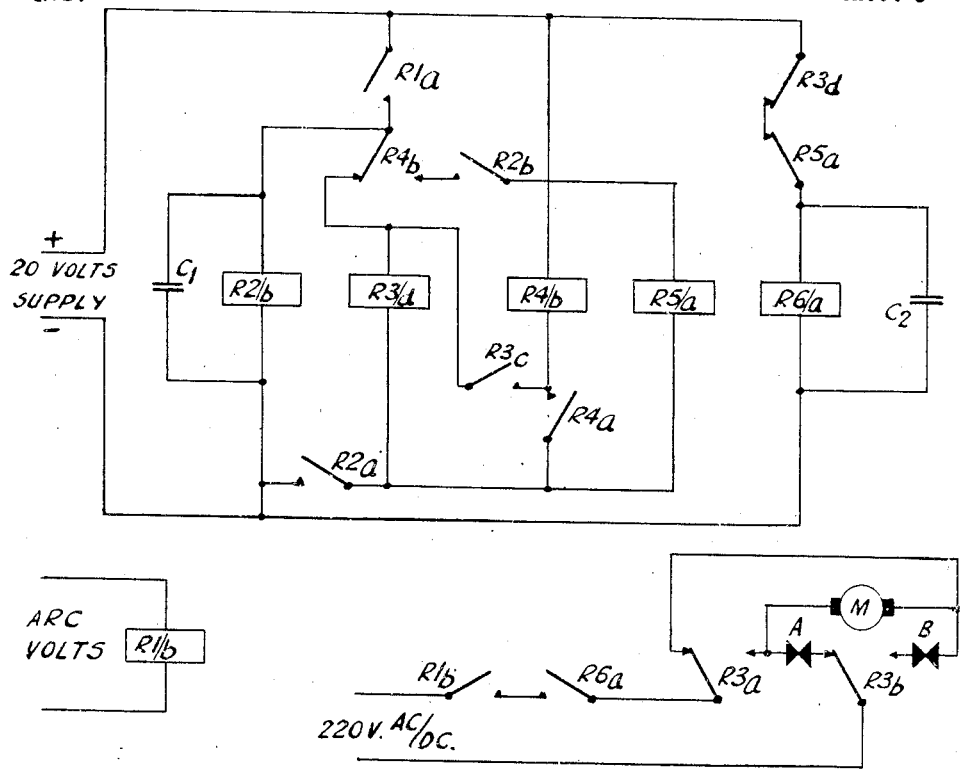
Figure 3 shows the circuit of a remote control arrangement in which the direction of adjustment is controlled by the number of times the arc is short-circuited, the adjustment continuing so long as the short-circuit is maintained.

Referring to the circuit shown in Figure 3, the apparatus comprises six relays R1 to R6 which are suffixed to indicate the number of relay contacts controlled by each relay. Only one of these relays, namely, R1 is shunted across the arc circuit, the remaining five relays being operated from a separate 20-volt supply. Relay R2 is shunted by a condenser C1 so as to give it a time delay release operation of approximately one second; relay R6 is similarly shunted by a condenser C2 giving a time delay release of approximately 1½ seconds. M represents an A. C./D. C. series motor controlling the output current and A and B the limits which open the motor circuit in the positions of maximum and minimum current output. Contacts 3a and 3b are actuated by the relay 3 and constitute reversing contacts for the motor circuit, normally resting in their left hand position, as shown, for clockwise rotation of the motor to raise the arc current but moving over to their right hand positions when the relay 3 is energised to drive the motor in the anti-clockwise direction to reduce the arc current.

The circuit shows the relays in their conditions during normal welding. The mode of operation of the circuit is as follows. It will be assumed that the operator is welding and desires to reduce the current output from the generator or other current supply means. To do this he makes a "dead short" by pressing the electrode, or the electrode holder, on to the work which de-energises the relay R1. At its contacts R1a a circuit is completed to energise the relay R2 and at its contact R1b it closes one of the switches in the motor circuit but the motor cannot operate because contact R6a is open.

Relay R2 energises and at its contact R2a completes the common return of all the relays R3, R4 and R5. Only relay R3 operates, however, through the left hand contact of R4b and contact R1a. At its contact R3c the relay R3 prepares a circuit for the relay R4 but this relay cannot operate as the winding of R4 is shunted by the contacts R4b and R1a. The relay R3 also shifts its contacts R3a and R3b to their right hand positions to prepare the circuit of the motor anti-clockwise rotation to move the current controller in a direction to reduce the current output. At its contact R3d it also opens the circuit for the relay R6.

After a time delay of 1½ seconds, the condenser C2 has discharged and relay R6 releases to complete the motor circuit at its contact R6a, whereupon the motor starts and the arc current is reduced.

The operator holds the short circuit until he considers that the current has reached the required new value and stops the motor by open-circuiting the arc. This energises relay R1 which breaks the motor circuit at contact R1b and at its contact R1a it breaks the circuit for the relays R2 and R3. Relay R2 remains energised, however, for a short time due to the time delay condenser C1 shunted thereacross, so that the common return lead to relays R4 and R5 through the contact R2a is not broken. Since the short circuit across the winding of the relay R4 has been removed by the opening of contact R1a, relay R4 energises and closes a locking circuit for itself at contact R4a. This short-circuits the relay R3 which releases and its contacts R3a and R3b return to their left hand positions and contact R3d again closes the circuit of the relay R6. Relay R4 changes its contact R4b over to its right hand position to prepare a circuit for the relay R5 through contacts R2b and R2a. However, after one second the relay R2 releases due to the discharge of its condenser and breaks the common return at its contact R2a. Relay R4 thus releases and contact R4b returns to its left hand position and cancels the prepared circuit for relay R5 which is now broken at two other points, namely, contacts R2a and R2b.

Restriking the arc produces fleeting "dead shorts," possibly three or four in rapid succession. The first fleeting impulse energizes relay R3 but all succeeding impulses are transferred to relay R5 through the right hand contact of R4b since relay R4 has been energized when the circuit of relay R3 was broken at the end of the first impulse, over the circuit previously described. The fleeting impulse causes contact R5a to oscillate thus opening and closing the circuit of relay R6 in rapid succession but relay R6 is held by its condenser C2 and the motor is not started. When the arc is drawn to its normal length the arc voltage again energizes relay R1 which therefore ceases to oscillate and breaks the circuit of relays R2 and R5 at its contacts R1a. Relay R2 is still held by its condenser, but after a delay of one second the condenser C1 discharges and relay R2 releases to break the circuit of relays R4 and R5 at contacts R2a and R2b. Contact R5a remains closed thus maintaining relay R6 energized which keeps its contact R6a in the motor circuit open. Relay R1, when it is energised, also opens the motor circuit at its contact R1b.

To increase the current a fleeting "dead short" is produced followed by a fleeting open-circuit and then a continuous "dead short." The fleeting "dead short" de-energises the relay R1 which operates relays R2 and R3 and prepares the circuit for relay R4 as previously explained. On opening the "dead short" the relay R1 again energises and at its contact R1a breaks the circuit of the relays R2 and R3. Relay R2 holds its contacts R2a and R2b closed so that relay R4 is energised and moves its contacts R4b to its right hand position to prepare the circuit for relay R5. Contacts R3a and R3b return to their left hand positions on relay R3 being de-energised. After the fleeting open-circuit a continuous "dead short" is produced. This again energises relay R1 which closes its contact R1a to complete the circuit of the relay R5 through the right hand contact of R4b and contacts R2b and R2a. At its contact R1b, the relay R1 also closes one of the switches in the motor circuit. The relay R5 is thus energised and opens its contact R5a to break the circuit of the relay R6. After a delay of 1½ seconds the condenser C2 discharges and relay R6 releases to complete the motor circuit at its contact R6a. The motor thus starts to move in a clockwise direction to drive the current controller in a direction to raise the current, the operator holding the "dead short" until he considers that the current has reached the required new value.

The motor is then stopped by open-circuiting the arc. This energises the relay R1 to break the circuits of relays R2, R4 and R5 at its contact R1a, and at its contact R1b opens the motor circuit to stop the motor. Relay R5 releases and closes the circuit of the relay R6 at its contact R5a. Relay R6 thus also breaks the motor circuit by opening its contact R6a. After a period of one second, condenser C1 discharges and relay R2 releases to break the common return at its contact R2a. Relay R4 then releases and its contact R4b returns to its left hand position ready for the next operating impulse. The arc is then restruck as above described and the welding proceeds with the current held at its new setting.

If a series of short impulses are transmitted by tapping the electrode holder on the work, these impulses will, with the exception of the first impulse, cause contact R5a to oscillate, but the motor will not be started due to the relay R6 being held by its condenser C2. If the electrode holder is left lying on the work, this is equivalent to one long impulse which after the predetermined time delay starts the motor moving in the anticlockwise direction so reducing the current to a minimum. The motor stops when the limit switch B is reached and the continuous "dead short" through the generator is reduced to a minimum thus giving automatic protection to the generator.

Figure 4:
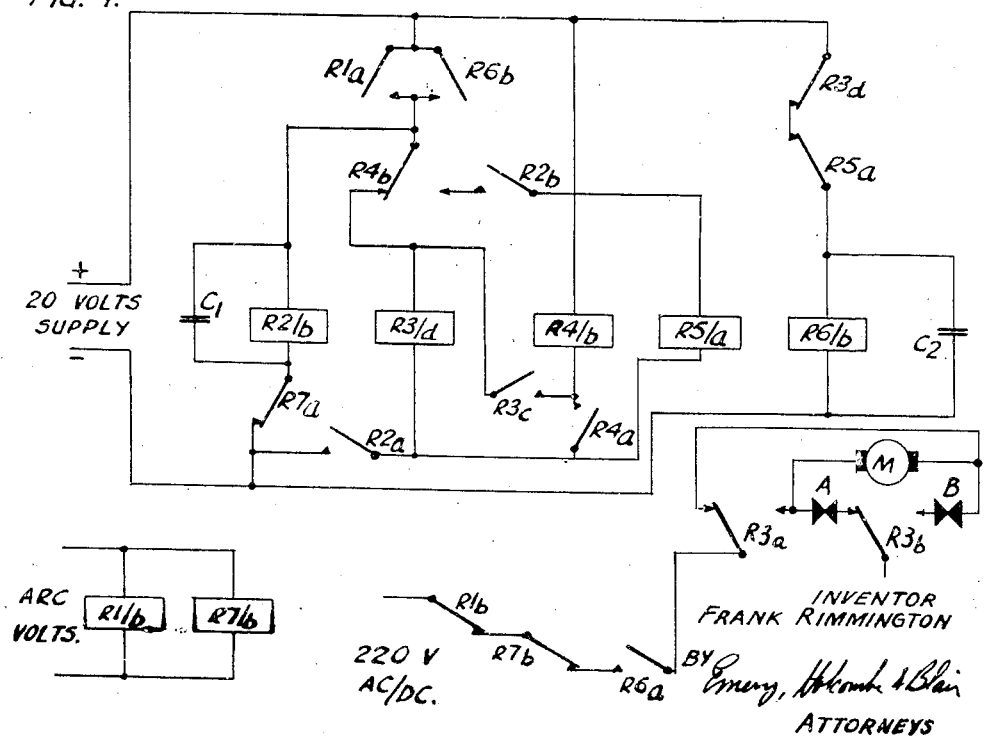
Figure 4 shows a modification in which the arc is restored to its normal value for visual control during the adjustment.

Figure 4 shows a modified circuit arrangement in which, to reduce the current a "dead short" is produced for 1½ seconds and then the arc is struck. This starts the motor and the falling current can be seen in the arc. The motor is stopped by open-circuiting the arc for one second and then restriking the arc when welding can proceed with the current held at its reduced value. The current is raised by first tapping the electrode holder on the work once in order to produce a fleeting "dead short" followed by a "dead short" of 1½ seconds duration, the arc then again being restruck. This time the current will be seen to increase and can be held at any desired value by again breaking the arc for one second. The arc is then restruck when the current will be held at the new value.

The circuit is very similar to that illustrated in Figure 1 except that an additional relay R7 is shunted across the arc circuit which has two contacts R7a and R7b, one in series with the relay R2 and another in the motor circuit. Relay R7 only energises upon open circuit of the arc so that its contacts are normally closed. Relay R6 is also provided with a second contact R6b in parallel with contact R1a.

To reduce the current the operator produces a "dead short" across the arc for 1½ seconds which releases relay R1. Contact R1a energises relay R2 through the left hand contact R4b and contact R7a. At its contact R1b the motor circuit is broken at a second point, it being also open at contact R6a. Relay R2 closes its contact R2a to complete the common return circuit of relays R3, R4, and R5, and relay R3 energises over contact R4b in its left hand position. Relay R3 closes its contact R3c to prepare the circuit for relay R4 but, as previously, relay R4 does not energise as it is short-circuited by the contact R1a. Relay R3 also moves its contacts R3a and R3b to their right hand positions to prepare the motor circuit for anticlockwise rotation to reduce the current output. Contact R3d opens and after a delay of 1½ seconds during which condenser C2 discharges, relay R6 de-energises and closes its contact R6a. It also closes its contacts R6b to lock the relays R2 and R3.

On restriking the arc contact R1 oscillates but relays R2 and R3 remain held over over the locking contact R6b. Drawing the arc raises the arc volts to over 15 volts. This energises relay R1 and its contact R1a ceases to oscillate and remains open but relays R2 and R3 still remain held over contacts R6b which now shunts the relay R4 to prevent it from energising. Contact R1b closes to complete the motor circuit which then commences to rotate in a direction to reduce the output current. The falling current can be observed in the arc.

The motor is stopped by open-circuiting the arc, for one second or longer. This causes relay R7 to energise which opens its contacts R7b to stop the motor and also its contacts R7a to break the circuit of relay R2. The condenser C1 discharges and after one second the relay R2 de-energises and breaks the common return circuit of relays R3, R4 and R5 at its contact R2a. Contact R3d is therefore closed to energise relay R6 which opens its contact R6a to break the motor circuit and its contact R6b to break the locking circuit of the relays R2 and R3. Relay R3 also opens its contact R3c to break the prepared circuit of relay R4 and its contacts R3a and R3b return to their left hand positions.

On restriking the arc relay R1 is deenergised and contacts R1a and R1b oscillate, but the motor cannot start because its circuit is also broken at contact R6a.

The first make of contact R1a sends a fleeting impulse through relay R2 and operates the other relays as above described, but relay R6 does not operate because the duration of the impulse is less than that necessary to discharge the condenser C2 and in fact is only a very small fraction of a second. At its first break contact R1a opens the short-circuit across the relay R4 which energises over the circuit which has already been prepared at contact R3c. Relay R4 closes its contact R4a to shunt relay R3 which releases and moves its contact R4b to its right hand position to prepare the circuit of the relay R5. It will be noted that once relay R4 has accepted the prepared circuit, it is free of the shunt effect of either contact R1a or contact R6b. Relay R5 now receives the impulses of the oscillations of R1a over the contact R4b in its right hand position and contacts R2b and R2a. Contact R5a thus oscillates but relay R6 is not affected because condenser C2 does not have time to discharge between the rapid oscillations of contact R5a. The motor circuit contact R6a and the locking contact R6b are thus not affected.

Drawing the arc raises the arc voltage to over 15 volts which energises relay R1 which stops its contacts R1a and R1b from oscillating. Contact R1b thus remains closed but the motor circuit is kept open at contact R6a. Relay R4 remains locked until C1 discharges, whereupon relay R2 releases to break the common return of relays R3, R4, R5 at its contact R2a. Contact R2b also opens and the relay R4 releases to open its contact R4a and allow its contact R4b to move to its left hand position. Welding can thus continue at the readjusted arc current value.

To raise the current a fleeting "dead short" is produced which completes the circuits previously described through relays R2 and R3 and prepares the circuit for the relay R4. Due to the short duration of the "dead short" relay R6 cannot operate and the succeeding fleeting open-circuit causes relay R4 to energise as previously explained to prepare the circuit for relay R5. Although contact R1a flicks open upon this open-circuit, it immediately closes again as soon as the following "dead short" of 1½ seconds duration is started so that C1 does not have time to discharge and R2 remains energised. The following "dead short" of 1½ seconds duration closes contact R1a to complete the circuit of relay R5 and contact R1b opens. Relay R5 opens its contact R5a to break the circuit of relay R6 which after a time delay of 1½ seconds, when condenser C2 has discharged, releases and closes its contact R6a in the motor circuit and its contact R6b in the locking circuit.

Upon restriking the arc contact R1a oscillates but relays R2 and R5 remain held by the locking circuit over contact R6b. Relay R4 also remains energized. Upon drawing the arc relay R1 is energized and contact R1a remains open, but relays R2 and R5 remain held over contact R6b. Contact R1b closes the motor circuit through contacts R3a and R3b in their left hand positions to drive the motor in a clockwise direction to increase the current, the increasing current being observable in the arc.

The motor is stopped by open-circuiting the arc for a period of one second or longer when the circuit operations previously explained take place, except that it is the relay R5 which closes its contact R5a to complete the circuit of the relay R6 which stops the motor by opening its contact R6a and opens the locking circuit of relays R2 and R5 at its contact R6b. The arc is then restruck and drawn as previously explained, and welding continues at the new value of the arc current.

Tapping the electrode holder on the work has the same effect as restriking the arc after an open-circuit to stop the motor, so that it has no effect on the current adjustment. If the operator should fail to restrike the arc after preparing the motor circuit for either raising or reducing the current, the whole circuit is restored to normal, regardless of which motor circuit was prepared, since, as soon as the arc is open-circuited, relay R7 energizes and breaks the circuit of relay R2 at its contact R7a which, after C1 has discharged, releases to break the common return circuit of relays R3, R4 and R5 at its contact R2a.

Various simplified circuit arrangements of Figs. 3 and 4 will be described with reference to Figs. 5 to 9 of the accompanying drawing. In all these arrangements the current is adjusted in the downwards direction by producing a "dead short" by pressing the electrode or the electrode holder on to the work and maintaining the "dead short" for a predetermined minimum time, and in the upwards direction by a fleeting "dead short" followed by a longer "dead short" of the predetermined time duration.

Figure 5:
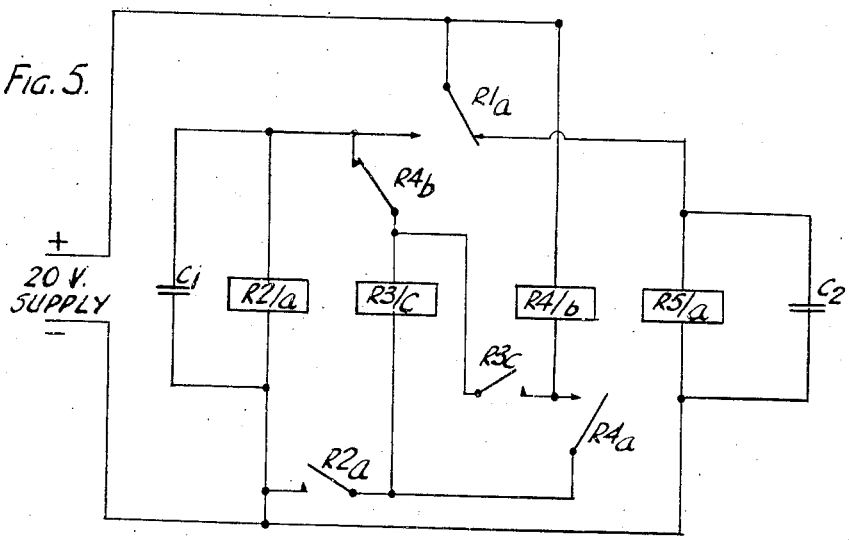

Referring to the circuit shown in Fig. 5, the apparatus comprises five relays R1 to R5 which are suffixed to indicate the number of relay contacts controlled by each relay. Relay R1 is shunted across the arc circuit and the remaining four relays are operated from a separate 20-volt supply. Relay R2 is shunted by a condenser C1 so as to give a time delay release operation of approximately one second and relay R5 is similarly shunted by a condenser C2 giving a time delay release of approximately 1½ seconds. M represents an A. C./D. C. series motor controlling the output current and A and B the limit switches which open the motor circuit in the maximum and minimum positions of the output current controller.

The circuit shows the relays in their conditions during normal welding. The mode of operation of the circuit is as follows. It will be assumed that the operator is welding and desires to reduce the current output from the generator or other current supply means. To do this he makes a "dead short" by pressing the electrode, or the electrode holder, on to the work which de-energizes the relay R1. At its contact R1a a circuit is completed from the 20-volt supply source to the relays R2 and R3 and the circuit to the relay R5 is broken. Relay R2 energizes and at its contact R2a completes the common return of relays R3 and R4. Relay R3 energizes and at its contact R3c prepares the circuit of relay R4 through the relay R3 and the contact R2a, but relay R4 cannot operate because it is shunted by contact R1a in its left-hand position. Relay R3 also shifts its contacts R3a and R3b to their right-hand position to prepare the circuit of the motor for anti-clockwise rotation to move the output current controller in a direction to reduce the current output.

After a time delay of 1½ seconds the condenser C2 discharges and releases relay R5 to complete the motor circuit at its contact R5a, whereupon the motor starts and the arc current is reduced.

The operator holds the short circuit until he considers the current has reached the desired new value and stops the motor by open-circuiting the arc. This energizes relay R1 which moves its contact R1a to its right-hand position and breaks the circuit for the relays R2 and R3 and makes the circuit for the relay R5 which energizes to open its contact R5a to stop the motor. Since contact R1a no longer shunts relay R4, this relay is energised through the relay R3. At its contact R4b it breaks the circuit of the relay R3 to prevent a "dead short" across condenser C1 and contact R4a closes immediately afterwards to complete a locking circuit for the relay R4. Contact R4a also shunts relay R3 which therefore releases and allows its contacts R3a and R3b to return to their left hand positions. After a period of one second the condenser C1 discharges and releases relay R2 which breaks the common return at its contact R2a to open the circuit of relay R4 which thus de-energizes.

Restroking the arc produces fleeting "dead shorts," the first of which energises relay R3 which is immediately tripped by relay R4 on the second impulse as above described. The fleeting impulses cause contact R1a to oscillate but relay R5 is held by the condenser C2 and the motor is thus not started. Upon drawing out the arc to its normal length the arc voltage again energises relay R1 and the oscillation of contact R1a ceases and it remains in its right hand position to break the circuit of the relays R2 and R3 and to complete the circuit of the relay R5. Relay R4 is de-energised due to the opening of contact R2a.

To increase the current a fleeting "dead short" is produced followed by a fleeting open circuit and then a continuous "dead short." The fleeting "dead short" de-energises relay R1 which operates relays R2 and R3 and prepares the circuit for relay R4 as previously explained. On opening the "dead short" the relay R1 again energises and breaks the circuit of the relays R2 and R3 to allow its contacts R3a and R3b to return to their left-hand position and also energising relay R4. Relay R4 remains energised during this fleeting open circuit since relay R2 is held by its condenser C1 and keeps its contact R2a closed, and upon the second "dead short" being produced relay R1 again releases and at its contact R1a breaks the circuit of the relay R5. Relay R4 still remains energised with relay R3 de-energised, so that after the condenser C2 has discharged relay R5 releases to complete the motor circuit at its contact R5a. The motor thus starts to move in a clockwise direction to drive the current controller in a direction to increase the current, the operator holding the "dead short" until he considers that the current has reached the required new value.

The motor is then stopped by open-circuiting the arc to energise the relay R1 which moves its contact R1a to its right-hand position to energise relay R5 which breaks the motor circuit at its contact R5a. After a delay of one second condenser C1 discharges and relay R2 releases to break the common return at its contact R2a. Relay R4 thus deenergises and releases its contacts to make the circuit ready for the next controlling impulse or impulses. The arc is then restruck as above described and the welding proceeds with the current held at its new setting.

Figure 6:
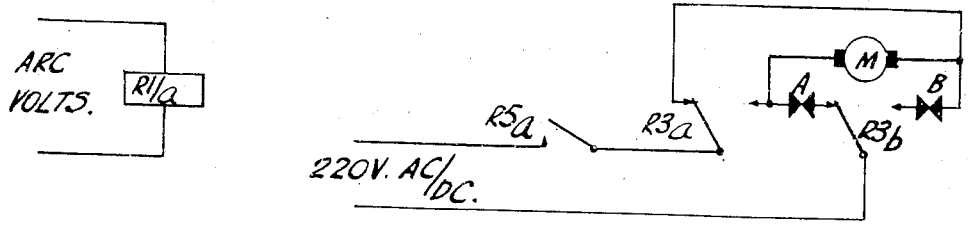
Figure 6:
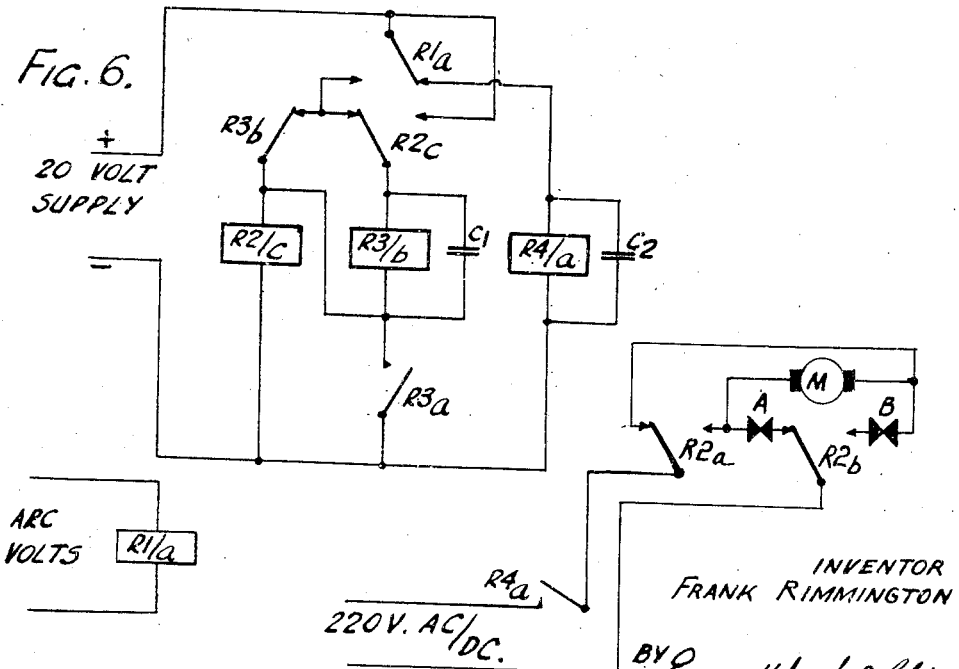

Fig. 6 shows a modified circuit employing only four relays. To reduce the current one "dead short" is made as previously. This deenergises relay R1 which at its contact R1a breaks the circuit of relay R4 and makes the circuit of relay R2. Relay R3, being short-circuited by its contact R3b and the left contact of R2c, is not energised. Relay R2 energises and changes its contacts R2a and R2b to their right-hand positions for anti-clockwise rotation of the motor. At the contact R2c, it prepares the circuit for relay R3 by moving to its right-hand position. Relay R3, being then short-circuited by contact R1a in its left-hand position in addition to contact R3b, still remains deenergised. After two seconds condenser C2 discharges through relay R4 and relay R4 releases and at its contact R4a completes the motor circuit to give the output current controller in a direction to reduce the current.

The motor is stopped by open-circuiting the arc which energises relay R1. Its contact R1a breaks the circuit of relay R2 and makes the circuit of relay R4 which latter relay energises and breaks the motor circuit at its contact R4a to stop the motor. Although the circuit of relay R2 is broken at contact R1a, R2 holds through the coil of relay R3 and contact R2c in its right-hand position. Since both contacts R1a and R2c are in their right-hand positions there is no short-circuit across relay R3 which therefore energises through the contact R2c in its right-hand position and the coil of relay R2 so that for a fraction of a second both relay R2 and R3 are in series and energised. During this brief interval condenser C1 is charged. Relay R3 closes its contact R3a to provide a locking circuit for itself which automatically short-circuits relay R2 which deenergises. It also opens its contact R3b. Upon the release of relay R2, its contacts R2a and R2b return to their left-hand positions and its contact R2c moves to its left-hand position to break the circuit of relay R3. After one second condenser C1 discharges and relay R3 deenergises to release its contacts R3a and R3b.

To increase the current two "dead shorts" are produced as previously. The first "dead short" energises the relay R2 and prepares the circuit for relay R3 as previously. The fleeting open circuit arrives before condenser C2 has time to discharge so that upon relay R1 energising again it breaks the circuit of relay R2 at its contact R1a and closes the circuit of relay R4, thus recharging condenser C2 before it has time fully to discharge. Relay R3 energises as above described and deenergises relay R2 which allows its contacts R2a and R2b to return to their left-hand positions. Before condenser C1 has time to discharge, however, the second "dead short" is produced and relay R1 is again released and allows its contact R1a to return to its left-hand position to complete the circuit to the relay R3 which remains energised. Since contact R3b is held open, this second impulse from contact R1a cannot energise relay R2 which, therefore, remains deenergised with its contacts R2a and R2b in their left-hand positions. After a delay of two seconds condenser C2 discharges and relay R4 releases to complete the motor circuit at its contact R4a which then operates to drive the motor in a direction to increase the current output.

The motor is again stopped by open-circuiting whereupon relay R1 energises and allows it contact R1a to return to its right-hand position thereby energising relay R4 which breaks the motor circuit at its contact R4a. In moving to the right the contact R1a breaks the circuit of relay R3 which after condenser C1 discharges releases.

Upon striking the arc a series of fleeting "dead shorts" is produced, the first of which energises relay R2 and the second energises relay R3 as above described. During succeeding fleeting impulses contact R1a oscillates rapidly and also maintains the charge on the condensers C1 and C2. Thus, although the motor circuit is prepared for clock-wise running it cannot start because relay R2 is held energised. Upon drawing out the arc to its normal length, contact R1a ceases to oscillate and is held in its right-hand position. Relay R3 thus releases after its condenser C1 has discharged and the circuit returns to normal.

Fig. 7 shows a slight modification of a control arrangement employing four relays in which the relays R2 and R3 are arranged in parallel instead of in series as in the arrangement shown in Fig. 6.

With the arrangement shown in Fig. 7 to reduce the current one "dead short" is produced which releases relay R1. Its contact R1a moves to its left-hand position and relay R2 is energised through contact R3a and the normally closed lower contact of R2d. Relay R2 energises and closes its upper contact of R2d, which moves its middle spring to open its lower contact. Relay R2 thus locks itself through its upper contact of R2d and contact R3b. Its contact R2c moves to its right-hand position to prepare the circuit for relay R3. Although relay R3 is now shunted across relay R4 and condenser C2, it will not energise from the discharging current of the condenser C2 because it is of lower resistance than relay R4. This arrangement necessitates, however, a larger capacity for the condenser C2 because when relay R3 is shunted across it by contact R2c moving to its right-hand position, the resistance across condenser C2 is reduced which increases the rate of discharge and would, without such an increase in capacity, reduce the time delay of relay R4.

Relay R2 also changes its contacts R2a and R2b to their right-hand positions to prepare the motor for anticlockwise rotation, and after the two seconds delay condenser C2 discharges and relay R4 de-energises and releases its contact R4a to complete the motor circuit.

The motor is stopped by open-circuiting the arc, whereupon relay R1 energises and moves its contact R1c to its right-hand position to complete the circuit for relay R4, which opens its contact R4a to stop the motor. Relay R3 becomes energised and at its contact R3a prepares another circuit for itself. It opens its contact R3b to break the locking circuit for relay R2 which releases and allows its contacts R2a, R2b and R2c to return to their left-hand positions. Relay R3 is held energised by the charge in condenser C1. The upper contact of R2d opens and allows its lower contact to close, but the circuit to the left-hand contact of R1a is broken at R3a. After one second condenser C1 discharges and relay R3 releases to return the circuit to normal. Contact R3a returns to its left-hand position and contact R3b closes.

To increase the current, the first "dead short" completes the circuits to relay R2 above described. The fleeting open circuit before condenser C2 has time to discharge energises relay R1 and causes its contact R1a to return to its right-hand position. The circuit to relay R3 is thus completed as above described and relay R2 is deenergised. The second "dead short" before condenser C1 has had time to discharge causes contact R1a to return to its left-hand position and completes the circuit to relay R3 through contact R3a, which is now in its right-hand position, and contact R2c, which is in its left-hand position. Since contact R3a is in its right-hand position this second impulse from contact R1a cannot reach relay R2 which, therefore, remains deenergised and its contacts R2a and R2b remain in their left-hand positions. After a time interval of two seconds condenser C2 discharges and relay R4 deenergises to complete the motor circuit for clockwise rotation at its contact R4a.

The motor is stopped by open-circuiting the arc which energises relay R1 and causes its contact R1a to move to its right-hand position to break the circuit to relay R3 and make the circuit to relay R4 which latter breaks the motor circuit at its contact R4a. After condenser C1 discharges relay R3 releases and the circuit returns to normal.

Upon striking the arc a series of fleeting "dead shorts" is produced, the first and second preparing the circuits as shown for increasing the current. The third and any succeeding short-circuits cause contact R1a to oscillate which merely maintains condensers C1 and C2 charged and prevents the motor circuit from being completed. Upon drawing the arc to its normal length contact R1a ceases to oscillate and is held in its right-hand position. Relay R3, therefore, deenergises when the condenser C1 discharges.

In the further modification shown in Fig. 8 only three relays are used in conjunction with a separate 20-volt supply. The mode of operation of the circuit is as follows. To reduce the current a "dead short" is produced which releases relay R1. Its contact R1a moves to its right-hand position thus breaking the circuit to relay R1. Its contact R1b moves to its left-hand position to break the circuit of relay R3 and preparing the circuit for relay R2. After a time delay of two seconds, condenser C2 discharges and relay R3 releases and at its contact R3a completes the motor circuit through contacts R2a and R2b in their left-hand position to drive the motor in the direction to reduce the current.

The motor is stopped by open-circuiting the arc. Upon open-circuiting the voltage across the arc circuit rises to 40 volts or more and relay R2 energises. Its contact R2c moves to its right-hand position and transfers relay R2 to the separate 20-volt power supply via contact R1b in its left-hand position. Condenser C1 charges and relay R2 changes its contacts R2a and R2b to their right-hand positions. Contact R2d also closes to remake the circuit to relay R1 which energises and moves its contact R1a to its left-hand position to lock relay R1. Its contact R1b moves to its right-hand position to break the circuit to relay R2. Relay R3 makes and at its contact R3a breaks the motor circuit. After a time interval of one second condenser C1 discharges and relay R2 releases which allows its contacts to return to their normal positions, relay R1 being held over contact R1a in its left-hand position.

To increase the current two "dead shorts" are produced, the first opens the circuit to relay R3 as above described, but before R3 can de-energise due to the discharge of condenser C2 the fleeting open circuit has restored contact R1b to its right-hand position and relay R2 has energised and shifted its contacts R2a and R2b to their right-hand positions as above described. The second "dead short" again releases R1 but this time relay R2 is energised having been held by condenser C1 during the fleeting open circuit when contact R1b flicked over to its right-hand position. After a delay of two seconds condenser C2 discharges and relay R3 releases to close its contact R3a to complete the motor circuit via contacts R2a and R2b in their right-hand positions for driving the motor to increase the current.

The motor is again stopped by open-circuiting the arc which energises relay R1 through contact R2d, relay R1 locking itself by moving its contact R1a to its left-hand position. Contact R1b is moved to the right and completes the circuit for relay R3 which opens its contact R3a to stop the motor and after a delay of one second condenser C1 discharges to release relay R2 to return the circuit to normal.

Upon striking the arc a series of "dead shorts" is produced which oscillate the contacts of relay R1 to impart impulses to relay R3 and condenser C2 over contact R1b in its right-hand position. The time interval between the pulses is so short that condenser C2 does not discharge and relay R3, therefore, remains energised and holds the motor circuit open. Upon drawing the arc to its normal length the arc voltage stabilises at about 17 volts or more and R1 ceases to oscillate and remains energised.

A still further feature of the invention as will be described with reference to Fig. 9 consists in connecting an electrically operated clutch in the drive between the motor and the output current controller whereby, when the motor is not operating, it is disconnected from the spindle of the output current controller so that the latter may be manually adjusted without moving the motor. This may be effected, for example, by providing a solenoid which is connected in parallel or in series with the motor circuit so that when the latter is closed the solenoid is actuated to cause a gear wheel to mesh in the gear train between the motor and the spindle of the output current controller. The gear wheel automatically moves out of mesh, for example under spring pressure, when the solenoid is de-energisd. The solenoid may have a small piece of iron disposed therein in order to increase the magnetic flux and its power of attraction.

A still further feature of the invention which may be applied to any of the arrangement described herein or in my above mentioned copending application consists, as will be more fully described with reference to Fig. 9, in the provision of a resistance in series with the control circuit shunted across the arc, the resistance being adjustable for different cable lengths so that the voltage across the control circuit can be adjusted to produce the correct operating voltages under all conditions. This resistance may be calibrated in cable lengths, being increased in value as the length of cable between the welding point and the control unit increases. Instead of employing an adjustable resistance, a voltage regulating arrangement, consisting for example of a material as known under the registered trade-mark "Metrosil," may be used for compensating for different cable lengths.

Fig. 9 shows a modification of the circuit arrangement illustrated in Fig. 8. An additional relay R0 is provided which is the only relay shunted across the arc circuit. The relay R0 has only one contact R0a, which is an advantage as this relay has to operate at rather critical voltages. The control circuit comprises the relays R1, R2 and R3 which are fed from the 30 volt D. C. supply derived from the transformer T and rectifier Z. The diagram also shows the solenoid S connected in series with the circuit of the motor M, which solenoid pulls the pinion P into engagement with the gear wheel G on the shaft of the output current controller when the motor is operating and disengage the shaft of the current controller when the motor is not running, thus enabling the current controller to be manually adjusted without moving the motor. The motor is geared to the shaft carrying the pinion P through a gear train.

In the circuit shown the motor M is an A. C. shaded pole motor which only requires one changeover contact for reversing.

The diagram also shows the line compensating resistance L connected in series with the relay R0 for the purpose of compensating for different lengths of cable to the welding point.

The mode of operation of the circuit is as follows. To reduce the current a "dead short" is produced which releases relay R0. Its contact R0a opens and breaks the circuit of relay R1. Its contact R1a moves to its right-hand position thus breaking the locking circuit of relay R1, and its contact R1b moves to its left-hand position to break the circuit of relay R3 and prepare the circuit for relay R2. After a time delay of two seconds, condenser C2 discharges and relay R3 releases and at its contact R3a completes the motor circuit through contact R2a in its left-hand position to drive the motor in the direction to reduce the current, and simultaneously energising the solenoid S to cause the pinion P to engage with the gear wheel mounted on the shaft of the output current controller.

The motor is stopped by open-circuiting the arc. Upon open-circuiting the voltage across the arc circuit rises to 40 volts or more and relay R0 energises and closes its contact R0a. This now completes the circuit of relay R2 via the left-hand contact of R2b, right-hand contact of R1a and R0a to the rectifier positive. Relay R2 energises and its contact R2b moves to its right-hand position and transfers R2 to the rectifier via R1b left-hand contact. Condenser C1 charges and relay R2 changes its contact R2a to the right-hand position. Its other contact R2c also closes to remake the circuit to relay R1 which energises and moves its contact R1a to the left-hand position to lock relay R1. Its contact R1b moves to its right-hand position to break the circuit of relay R2 and make the circuit of relay R3, which at its contact R3a breaks the motor circuit and de-energises the solenoid S. After a time interval of one second condenser C1 discharges and relay R2 releases which allows its contacts to return to their normal positions, i. e. R2c opens and R2a and R2b return to their left-hand positions. Relay R1 is held over its contact R1a in its left-hand position.

To increase the current two "dead shorts" are produced, the first opens the circuit of relay R3 as above described, but before relay R3 can de-energise, due to the discharge of condenser C2, the fleeting open circuit has restored contact R1b to its right-hand position and relay R2 has energised and shifted its contact R2a to its right-hand position as above described. The second "dead short" again releases relay R0 and its contact R0a opens to break the circuit of relay R1, which again releases, but this time relay R2 is energised having been held by condenser C1 during the fleeting open circuit when contact R1b flicked over to its right-hand position. After a delay of two seconds condenser C2 discharges and relay R3 releases to close its contact R3a to complete the motor and solenoid circuit via contact R2a in its right-hand position for driving the motor to increase the current.

The motor is again stopped by open-circuiting the arc which energises relay R0 and its contact R0a closes to remake the circuit of relay R1 via the closed contact R2c. Relay R1 thus energises and locks itself by moving its contact R1a to its left-hand position. Contact R1b moves to the right and completes the circuit for relay R3 which opens its contact R3a to stop the motor and de-energise the solenoid, and after a delay of one second condenser C1 discharges to release relay R2 to return the circuit to normal.

Upon striking the arc a series of "dead shorts" is produced which oscillate the contact R0a of relay R0. This in turn causes the contacts of relay R1 to oscillate and impart impulses to relay R3 and condenser C2 each time its contact R1b flicks over to its right-hand position. The time interval between the impulses is so short that condenser C2 does not discharge and relay R3, therefore, remains energised and holds the motor circuit open. Upon drawing the arc to its normal length, the arc voltage stabilises at about 17 volts or more with the result that relays R0 and R1 cease to oscillate and remain held in the energised position.

Although particular embodiments of the invention have been described, it will be understood that these are only given by way of example and that various modifications may be made without departing from the scope of the invention as defined by the appended claims.

I claim:

1. Arrangement for the remote control of the current supply in electric arc welding systems, comprising an output current controller for controlling the current supply to the arc circuit, a reversible electric motor for driving said output current controller, a voltage selective relay shunted across the arc circuit, a control circuit comprising two time delay relays, power supply means for said control circuit, a switch contact in said control circuit actuated by said voltage selective relay, means for causing the first time delay relay to actuate in response to the number of times the said switch contact is actuated, reversing contacts in the motor control circuit actuated by said first time delay relay, means responsive to the first actuation of said switch contact for energising the second time delay relay, means for allowing said second time delay relay to fall off after said switch contact has remained closed for a predetermined minimum time, and a starting contact connected in said motor control circuit actuated by said second time delay relay.

2. Arrangement for the remote control of the current supply in electric arc welding systems, comprising an output current controller for controlling the current supply to the arc circuit, a reversible electric motor for driving said output current controller, a voltage selective relay shunted across the arc circuit, an adjustable resistance connected in series with said voltage selective relay, a control circuit comprising two time delay relays, power supply means for said control circuit, a switch contact in said control circuit actuated by said voltage selective relay, means for causing the first time delay relay to actuate in response to the number of times the said switch contact is actuated, reversing contacts in the motor control circuit actuated by said first time delay relay, means responsive to the first actuation of said switch contact for energising the second time delay relay, means for allowing said second time delay relay to fall off after said switch contact has remained closed for a predetermined minimum time, a starting contact connected in said motor control circuit actuated by said second time delay relay, an electrically operated clutch in the drive between the motor and the output current controller, and means for operating the clutch to couple the motor to the output current controller only when the motor is operating.

FRANK RIMMINGTON.

REFERENCES CITED

The following references are of record in the file of this patent:

UNITED STATES PATENTS

| Number | Name | Date |
|---|---|---|
| 392,370 | Sellon & Mordey | Nov. 6, 1888 |
| 435,332 | Thury | Aug. 26, 1890 |
| 2,221,588 | Kovalsky | Nov. 12, 1940 |